United States Patent
Coupe et al.

(10) Patent No.: US 12,221,726 B2
(45) Date of Patent: Feb. 11, 2025

(54) METHOD FOR THREE-DIMENSIONAL OR MULTILAYER WEAVING OF A FIBROUS STRUCTURE AND FIBROUS STRUCTURE HAVING A THREE-DIMENSIONAL OR MULTILAYER WEAVE

(71) Applicant: SAFRAN, Paris (FR)

(72) Inventors: Dominique Marie Christian Coupe, Moissy-Cramayel (FR); Célline Kribs, Moissy-Cramayel (FR); Adrienne Retiveau-Leca, Moissy-Cramayel (FR)

(73) Assignee: SAFRAN, Paris (FR)

( * ) Notice: Subject to any disclaimer, the term of this patent is extended or adjusted under 35 U.S.C. 154(b) by 1 day.

(21) Appl. No.: 18/547,543

(22) PCT Filed: Feb. 24, 2022

(86) PCT No.: PCT/FR2022/050343
§ 371 (c)(1),
(2) Date: Aug. 23, 2023

(87) PCT Pub. No.: WO2022/184999
PCT Pub. Date: Sep. 9, 2022

(65) Prior Publication Data
US 2024/0133084 A1    Apr. 25, 2024
US 2024/0229307 A9    Jul. 11, 2024

(30) Foreign Application Priority Data

Mar. 3, 2021   (FR) ...................................... 2102053

(51) Int. Cl.
*B29B 11/00*    (2006.01)
*D03D 1/00*    (2006.01)
(Continued)

(52) U.S. Cl.
CPC ............. *D03D 1/00* (2013.01); *D03D 13/004* (2013.01); *D03D 25/005* (2013.01); *B29B 11/16* (2013.01); *D10B 2505/02* (2013.01)

(58) Field of Classification Search
CPC ...... D03D 1/00; D03D 13/004; D03D 25/005; D03D 11/00; B29B 11/16; D10B 2505/02
See application file for complete search history.

(56) References Cited

U.S. PATENT DOCUMENTS 6,129,122 A * 10/2000 Bilisik ................. D03D 25/005
139/11
7,101,154 B2 * 9/2006 Dambrine ............... B29C 70/48
442/205

(Continued)

FOREIGN PATENT DOCUMENTS

WO    WO 2010/061140 A1    6/2010

OTHER PUBLICATIONS

International Search Report as issued in International Patent Application No. PCT/FR2022/050343, dated Jun. 3, 2022.

*Primary Examiner* — Robert H Muromoto, Jr.
(74) *Attorney, Agent, or Firm* — Pillsbury Winthrop Shaw Pittman LLP (57) ABSTRACT

A fibrous structure intended to form the fibrous reinforcement of a part made of composite material includes a fibrous reinforcement densified by a matrix, the fibrous structure having a three-dimensional or multilayer weave between a plurality of layers of warp yarns and a plurality of layers of weft yarns. The fibrous structure includes at least a first portion having a first type of weave and a second portion, continuing on from the first portion, having a second type of weave, the warp yarns and the weft yarns having a degree of (Continued)

interweaving in the first type of weave that is greater than the degree of interweaving of the warp yarns and the weft yarns in the second type of weave.

13 Claims, 4 Drawing Sheets

(51) Int. Cl.
  *D03D 13/00* (2006.01)
  *D03D 25/00* (2006.01)
  *B29B 11/16* (2006.01)
  *D03D 11/00* (2006.01)

(56) References Cited

U.S. PATENT DOCUMENTS

| | | | | |
|---|---|---|---|---|
| 7,241,112 | B2* | 7/2007 | Dambrine | F04D 29/023 415/230 |
| 8,505,588 | B2* | 8/2013 | Coupe | D03D 25/005 139/11 |
| 9,597,841 | B2* | 3/2017 | Dambrine | B29B 11/16 |
| 10,145,039 | B2* | 12/2018 | Marchal | B29D 22/00 |
| 10,746,046 | B2* | 8/2020 | Provost | B29B 11/16 |
| 11,686,203 | B2* | 6/2023 | Pouzadoux | F01D 5/282 416/230 |
| 2005/0084377 | A1* | 4/2005 | Dambrine | F04D 29/023 416/223 R |
| 2006/0257260 | A1* | 11/2006 | Dambrine | F04D 29/023 416/230 |
| 2011/0182743 | A1* | 7/2011 | Naik | B29D 99/0025 29/889.71 |
| 2011/0277869 | A1* | 11/2011 | Coupe | D03D 25/005 139/408 |
| 2014/0349538 | A1* | 11/2014 | Marchal | F01D 5/147 156/227 |
| 2018/0148381 | A1* | 5/2018 | Delehouze | C04B 35/01 |
| 2019/0106816 | A1* | 4/2019 | Beagle | D03D 11/00 |
| 2020/0010986 | A1* | 1/2020 | Falkenberg | D04C 3/38 |
| 2023/0113922 | A1* | 4/2023 | Pouzadoux | F01D 5/147 416/230 |
| 2024/0133084 | A1* | 4/2024 | Coupe | D03D 1/00 |
| 2024/0229307 | A9* | 7/2024 | Coupe | D03D 1/00 |

* cited by examiner

ical field

METHOD FOR THREE-DIMENSIONAL OR MULTILAYER WEAVING OF A FIBROUS STRUCTURE AND FIBROUS STRUCTURE HAVING A THREE-DIMENSIONAL OR MULTILAYER WEAVE

CROSS-REFERENCE TO RELATED APPLICATIONS

This application is the U.S. National Stage of PCT/FR2022/050343, filed Feb. 24, 2022, which in turn claims priority to French patent application number 2102053 filed Mar. 3, 2021. The content of these applications are incorporated herein by reference in their entireties.

TECHNICAL FIELD

The present invention relates to the production of parts made of composite material and more particularly the production by three-dimensional (3D) or multilayer weaving of fibrous reinforcement structures for such parts.

PRIOR ART

A field of application of the invention is the production of parts made of structural composite material, in other words structural parts with fibrous reinforcement and densified by a matrix. Composite materials make it possible to produce parts having a lower overall mass than the same parts when they are made of metal material.

The 3D or multilayer weaving of fibrous structures intended to constitute the fibrous reinforcement of a part made of composite material, such as an aircraft engine blade for example, is performed on a Jacquard-type loom, the weaving consisting of inserting weft yarns, creating a pattern, between the warp yarns. The warp yarns are organised on the harness of the loom in a plurality of layers and columns which are manipulated by the loom in order to enable the insertion of the weft yarns according to the weaving pattern or patterns programmed on the loom. The weft yarns are inserted between the warp yarns by column. Document US 2005/084377 describes the production by three-dimensional weaving of a fibrous preform intended for the manufacture of a turbine blade made of composite material.

In order to enable the introduction of each column of weft yarns during the weaving of the fibrous structure, a system for drawing the warp yarns is associated with the loom. This system, placed downstream of the loom, has the role of holding all the warp yarns together in a securing or clamping device and enabling the advance of the warp yarns by a determined distance after the insertion of each weft column.

Hence the securing device for the warp yarns upstream of the loom is necessary at the start of a new weaving of a fibrous structure. At the end of weaving, the fibrous structure is released from the securing device.

After weaving, the fibrous structure has a loose portion without cohesion, corresponding to the part of the fibrous structure woven first and located closest to the securing device. In this portion, the first woven weft columns are in contact with a zone consisting uniquely of warps without interweaving. The density of the fabric produced downstream therefore has a tendency to push these first columns towards the securing system, the absence of interweaving facilitating this slipping.

Consequently, the fibrous structure has a portion extending over a non-negligible length which cannot be preserved in order to form the fibrous reinforcement of the part to be manufactured because the spacing between the weft columns is not controlled. Indeed, the volumetric proportion of fibres in a part made of composite material is an important parameter for the mechanical properties of the part, this proportion being determined by type of weave and the control of the spacing between the columns of yarns. This lack of control at the start of weaving causes a significant material loss which increases both the weaving time and the manufacturing cost of the fibrous structure.

It is therefore desirable to be able to have available 3D or multilayer fibrous structures that do not have the above cited disadvantages.

DISCLOSURE OF THE INVENTION

To this effect, the invention proposes, according to a first object, a method for weaving a fibrous structure intended to form the fibrous reinforcement of a part made of composite material comprising a fibrous reinforcement densified by a matrix, the fibrous structure being woven as a single piece by three-dimensional or multilayer weaving between a plurality of warp yarn layers and a plurality of weft yarn layers, characterised in that it comprises at least one first weaving step in which the warp yarns and the weft yarns are woven according to a first type of weave, and a second weaving step in which the warp yarns and the weft yarns are woven according to a second type of weave, the warp yarns and the weft yarns having a degree of interweaving in the first type of weave greater than the degree of interweaving of the warp yarns and weft yarns present in the second type of weave.

The first portion thus constitutes a starting block or "back stop" which, due to its high degree of interweaving, prevents the slipping of the weft yarns then woven in the second portion. The spaces between the weft columns are thus controlled from the start of the weaving of the second portion, which makes it possible to immediately obtain a fibrous structure which respects the type of weave defined and consequently makes it possible to achieve much lower material loss than with the weaving technique of the prior art.

According to a particular aspect of the method of the invention, the warp yarns and the weft yarns present in the first type of weave have a degree of interweaving greater than or equal to 1.5 times the degree of interweaving of warp yarns and weft yarns present in the second type of weave.

According to another aspect of the method of the invention, the first and second weaves are of the same type.

According to another particular aspect of the method of the invention, the first and second weaves are of a different type.

According to another particular aspect of the method of the invention, the type of the first and second weaves is chosen from one of the following types: interlock, 3D orthogonal, multilayer plain or multilayer twill or multilayer satin.

According to another particular aspect of the method of the invention, the first type of weave extends over at least 4 weft columns of consecutive columns of weft yarns.

Another object of the invention is a method for manufacturing a part made of composite material comprising the following steps:
producing a fibrous structure conforming to the method of weaving a fibrous structure according to the invention,
removing the first portion of the fibrous structure,
shaping the fibrous structure in order to form a fibrous preform of the part to be manufactured, densifying the fibrous preform.

Another object of the invention is a fibrous structure intended to form the fibrous reinforcement of a part made of composite material comprising a fibrous reinforcement densified by a matrix, the fibrous structure having a three-dimensional or multilayer weaving between a plurality of warp yarn layers and a plurality of weft yarn layers, characterised in that it comprises at least one first portion having a first type of weave and a second portion continuing on from the first portion having a second type of weave, the warp yarns and the weft yarns having a degree of interweaving in the first type of weave greater than the degree of interweaving of the warp yarns and weft yarns present in the second type of weave.

According to a particular aspect of the fibrous structure of the invention, the warp yarns and the weft yarns present in the first type of weave have a degree of interweaving greater than or equal to 1.5 times the degree of interweaving of warp yarns and weft yarns present in the second type of weave.

According to another particular aspect of the fibrous structure of the invention, the first and second weaves are of the same type.

According to another particular aspect of the fibrous structure of the invention, the first and second weaves are of a different type.

According to another particular aspect of the fibrous structure of the invention, the type of the first and second weaves is chosen from one of the following types: interlock, 3D orthogonal, multilayer plain, multilayer twill, multilayer satin.

According to another particular aspect of the fibrous structure of the invention, the first type of weave extends over at least 4 weft columns of consecutive columns of weft yarns.

DESCRIPTION OF THE EMBODIMENTS

The invention applies, in general, to all fibrous structures formed by three-dimensional or multilayer weaving which are able to constitute fibrous reinforcements, or preforms for the manufacture of parts made of composite material, in particular aircraft engine blades, the parts being obtained by densifying of fibrous structures by a matrix. The matrix is typically a resin in the case of composite materials used at relatively low temperature, typically up to 300° C., or a refractory material such as carbon or ceramic in the case of thermostructural composites.

Here, the term "three-dimensional weaving" or "3D weaving" shall mean a method of weaving by which at least some warp yarns bind weft yarns over a plurality of weft layers.

Here the term "multilayer weaving" shall mean a 3D weaving with a plurality of weft layers, for which the base weave of each layer is equivalent to a conventional 2D fabric weave, such as a plain, satin or twill weave, but with certain points of the weave which bind the weft layers to one another.

The production of the fibrous structure by 3D or multilayer weaving makes it possible to obtain a bond between the layers, and therefore to have a good mechanical strength of the fibrous structure and of the piece made of composite material obtained, in a single textile operation.

Figure 1:
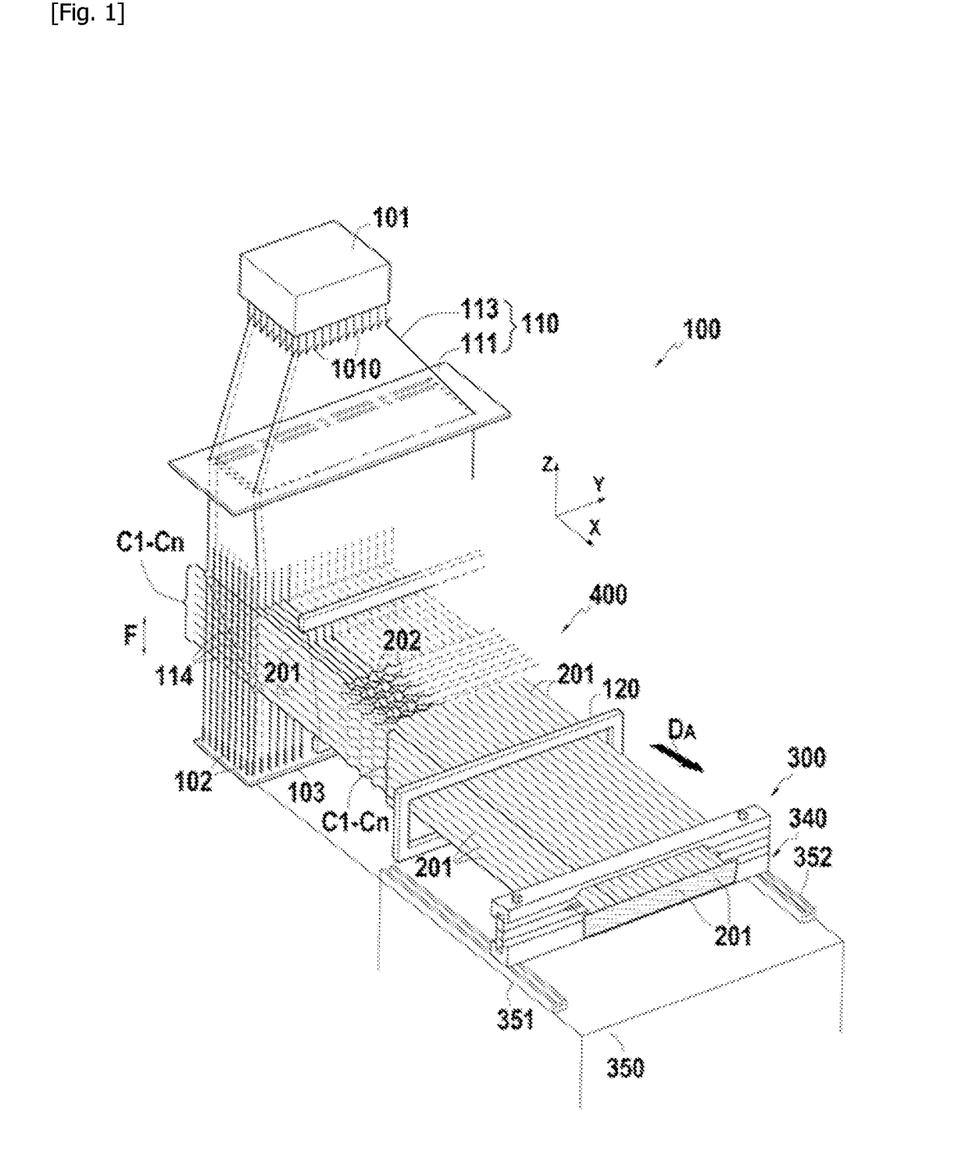
FIG. 1 is a schematic perspective view of a loom for implementing the weaving method of the invention.

FIG. 1 illustrates a loom 100 equipped with a Jacquard mechanism 101 supported by a superstructure that is not shown in FIG. 1. The loom 100 also comprises a harness 110 consisting of a bottom board 111 and control wires or heddles 113, each heddle 113 being connected at one end to a control hook 1010 of the Jacquard mechanism 101 and at the other end to one of the return springs 102 fixed to the frame 103 of the loom 100. Each heddle 113 comprises an eyelet 114 passed through by a warp yarn 201. The heddles 113 and their associated eyelet 114 extend in a zone in which the heddles 113 and the eyelets 114 are driven by a substantially vertical oscillating movement represented by the double arrow F. The so heddles 113 are subjected to traction forces respectively exerted by the control hooks 1010 and by the return springs 102. The heddles 113 enable certain warp yarns 201 to be lifted according to a defined weaving program. By lifting certain warp yarns 201, the heddles 113 thus create a shed enabling the introduction of weft yarns 202 for the 3D or multilayer weaving of the fibrous structures. The warp yarns 201 are organised in a plurality of warp yarn layers $C_1$ to $C_n$.

The warp yarns 201 are drawn from bobbins disposed on a bobbin creel (not shown in FIG. 1) upstream of the Jacquard mechanism 101 of the loom 100. To this effect, as illustrated in FIG. 1, a system for drawing warp yarns 300 is associated with the loom 100, downstream thereof. The framework 120 delimits the outlet of the loom 100, in other words the zone after which the warp yarns 201 are no longer woven with the weft yarns 202. The system for drawing warp yarns 300 comprises a securing device 340 intended to hold, by clamping, a set of layers $C_1$ to $C_n$ of warp yarns downstream of the loom 100.

During the weaving of a fibrous structure 400, the warp yarns 201 are driven in the direction of advance $D_A$ by the securing device. More precisely, in the example described here, the securing device 340 is mounted on rails 351 and 352 on a frame 350 of the system for drawing warp yarns 300 so as to enable the movement of the securing device. The movement of the securing device 300 is produced by a motor, for example a stepper motor (not shown in FIG. 1). Each time that a column of weft yarns 202 is entirely woven with the warp yarn layers $C_1$ to $C_n$, the securing device 340 is driven in the direction $D_A$ over a distance enabling the insertion and the weaving in the loom 100 of the following weft column.

Figure 2:
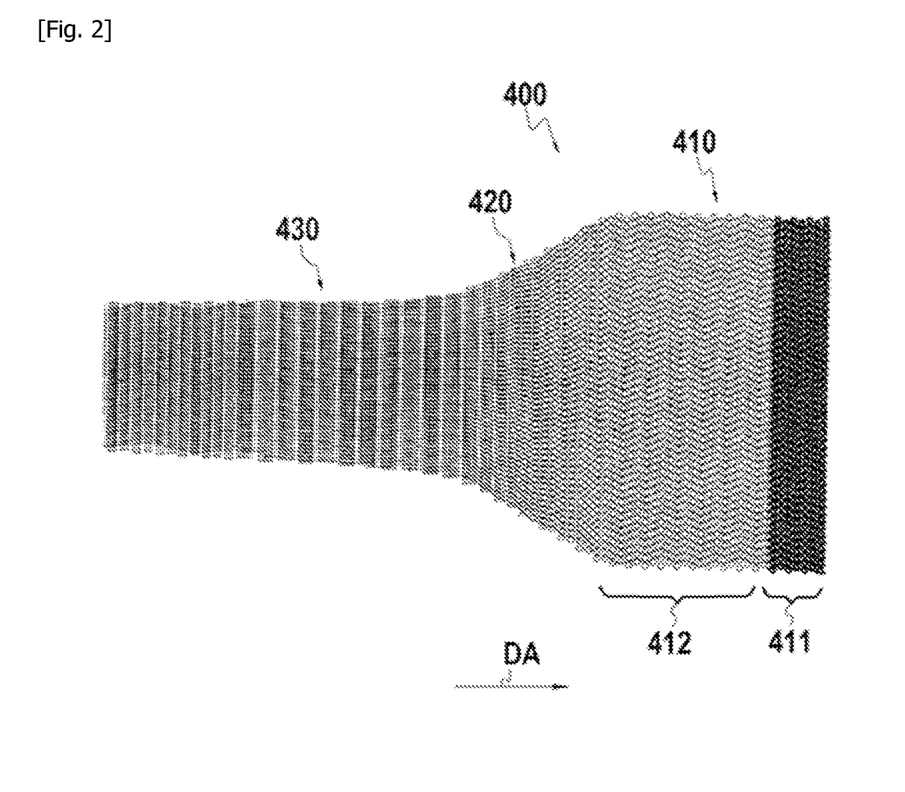
FIG. 2 is a weft sectional view in the warp direction of a fibrous structure in accordance with an embodiment of the invention.

FIG. 2 illustrates a fibrous structure 400 woven as a single piece by three-dimensional weaving. The part of the fibrous structure 400 shown in FIG. 2 corresponds to a blade root preform 410 prolonged by a blade stilt preform 420 of a turbine blade fibrous reinforcement made of composite material followed by an aerofoil or profile preform part 430.

In the example described here, the fibrous structure 400 is woven according to a 3D "interlock" weave. Here, the term "interlock" weave means a weave in which each layer of weft yarns links a plurality of layers of warp yarns with all the yarns of the same weft column having the same movement in the weave plane. A detailed exemplary embodiment of a fibrous preform for forming the fibrous reinforcement of a blade for an aircraft engine from a 3D woven fibrous blank is described in detail, in particular, in documents U.S. Pat. Nos. 7,101,154, 7,241,112 and WO 2010/061140.

The blade root preform 410 corresponds to the first woven part of a blade preform (i.e. first woven part which leaves the loom), the stilt preform 420 and the aerodynamic aerofoil or profile blade preform part 430 then being woven in the extension of the blade root preform 410.

In accordance with the invention, the fibrous structure 400 has, at the start of the blade root preform 410, a first portion 411 for which the type of weave has a degree of interweaving of the warp yarns and weft yarns greater than the degree of interweaving of the warp yarns and weft yarns exhibited by the type of weave in a second weave portion 412 located downstream of the first weave portion in the direction $D_A$ corresponding to the direction of advance of the fibrous structure at the outlet of the loom.

Figure 3:
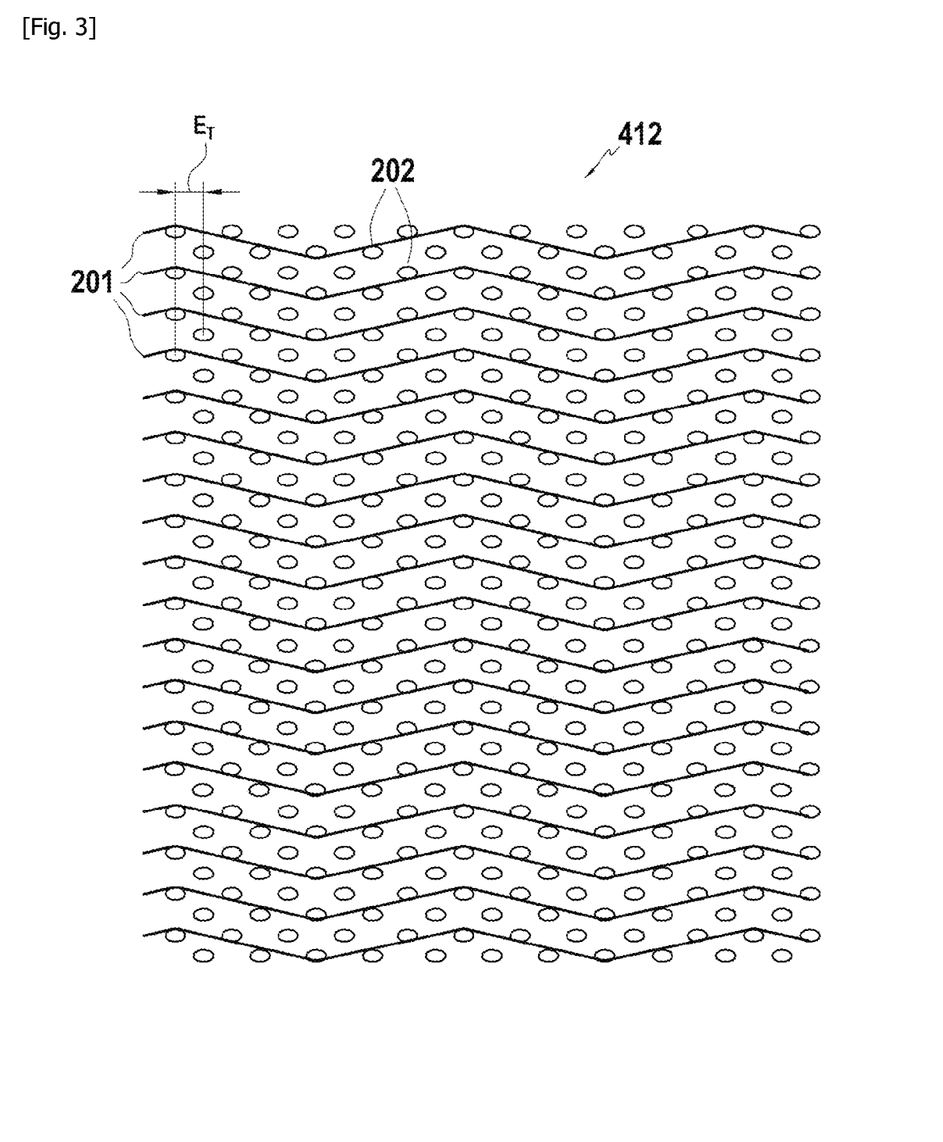
FIG. 3 is a partial sectional view in the warp direction, on an enlarged scale, of a portion of the fibrous structure of FIG. 2.
Figure 4:
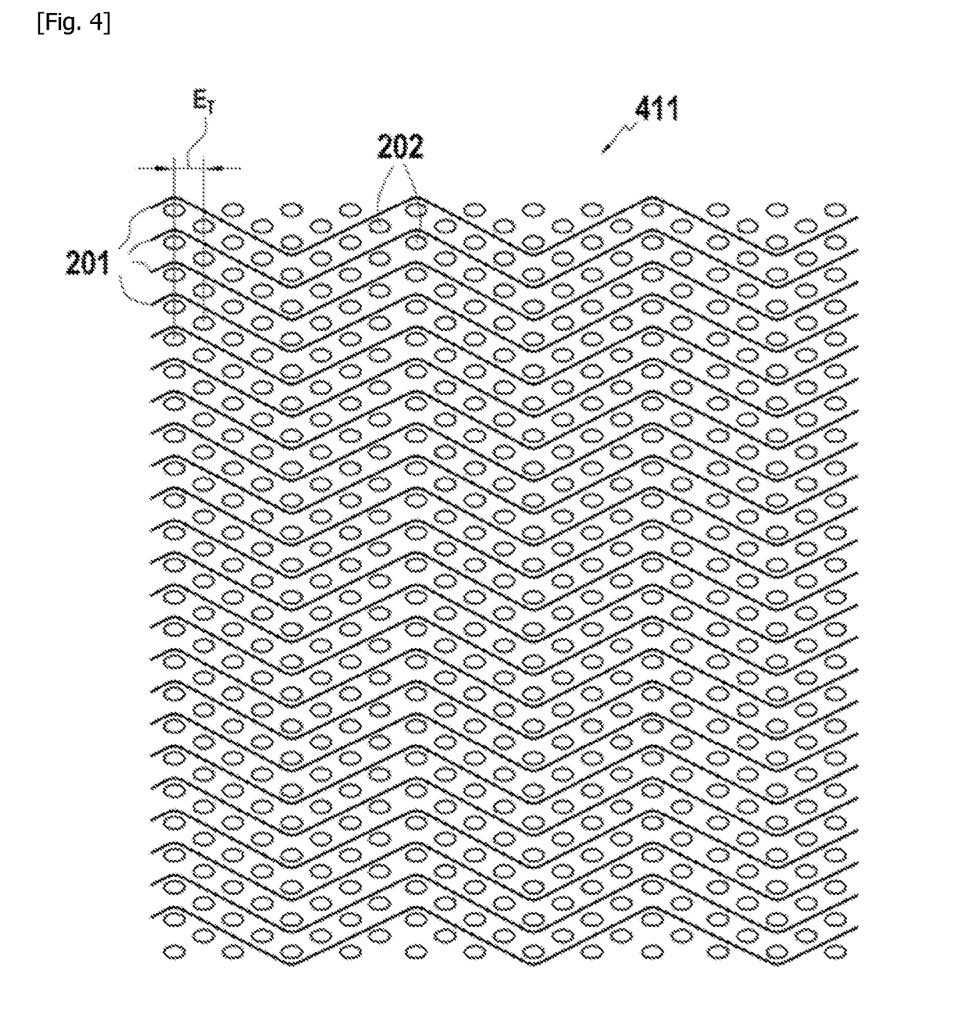
FIG. 4 is a partial sectional view in the warp direction, on an enlarged scale, of another portion of the fibrous structure of FIG. 2, having a degree of interweaving greater than that of the rest of the fibrous structure.

The degree of interweaving of the warp yarns and weft yarns in a three-dimensional fabric can be calculated with the following formula:

$$T_E = N_{CT}(R_A \times E_T \times E_C)$$

where:—$T_E$ corresponds to the degree of interweaving between warp yarns and weft yarns in a three-dimensional fabric, $N_{CT}$ corresponds to the number of layers of the yarns crossed by the warp yarns and/or the weft yarns, $R_A$ corresponds to the weave ratio, in other words the number of weft columns over which the pattern of the weave type repeats, $E_T$ corresponds to the spacing between two weft columns which can also be defined as the weft texture (FIGS. 3 and 4), $E_C$ correspond to the spacing between warp columns which can also be defined as the warp texture (as shown for $E_T$ in FIGS. 3 and 4).

FIG. 3 is an enlarged partial view of a weft sectional plane of the type of weave of the second weave portion 412 obtained by 3D weaving between the warp yarns 201 and weft yarns 202 according to an interlock weave. In this example, the number $N_{CT}$ of weft yarn layers crossed by the warp yarns is 2, the weave ratio $R_A$ is 10 (weft columns), the spacing $E_T$ between two weft columns is 2 mm and the spacing $E_C$ (not shown in 3) between two warp columns is 3 mm. Consequently, the degree of interweaving $T_E$ here is:

$$T_E = 2/(10 \times 2 \times 3) = 0.033.$$

FIG. 4 is an enlarged partial view of a weft sectional plane of the type of weave of the first weave portion 411 obtained by 3D weaving between the warp yarns 201 and weft yarns 202. In this example, the number $N_{CT}$ of weft yarn layers crossed by the warp yarns is 3, the weave ratio $R_A$ is 8 (weft columns), the spacing $E_T$ between two weft columns is 2 mm and the spacing $E_C$ (not shown in FIG. 4) between two warp columns is 3 mm. Consequently, the degree of interweaving $T_E$ here is:

$$T_E = 3/(8 \times 2 \times 3) = 0.0625.$$

Consequently, the first portion 411 has a greater degree of interweaving than that of the portion 412 corresponding to the rest of the fibrous structure.

The first portion 411 thus constitutes a starting block or "back stop" which, due to its high degree of interweaving, prevents the slipping of the weft yarns then woven in the second portion 412. The spaces between the weft columns (weft texture) are thus controlled from the start of the weaving of the second portion 412, which makes it possible to obtain immediately a fibrous structure which respects the type of weave defined and consequently makes it possible to achieve much lower material loss than with the weaving technique of the prior art.

In the fibrous structure of the invention, the only sacrificial part, in other words the part of the fibrous structure which will be removed from the fibrous reinforcement constituting the part made of composite material to be produced, is the first portion with high degree of interweaving.

The type of weave used in the first and second portions of the fibrous structure can be the same type, such as an interlock weave type illustrated in FIGS. 3 and 4, but with a different degree of interweaving between the two portions. According to an alternative, the type of weave used in the first portion can be of a different type from the weave used in the second portion, for example in the case where the weave used in the second portion cannot be repeated in the first portion with a higher degree of interweaving.

By way of non-limiting examples, the weave type used in order to form the first portion and/or the second portion can be chosen from one of the following types: interlock, 3D orthogonal, multilayer plain, multilayer twill multilayer satin.

Furthermore, the portions of the fibrous structure according to the invention each combine different types of weaves. Indeed, for example, it may be advantageous to promote obtaining, after densification, a surface state that is free of large irregularities, in other words a good state of finish in order to avoid or limit finishing operations by machining or to avoid the formation of clumps of resin in the case of resin matrix composites. For this purpose, in the case of a fibrous structure having an inner part, or core, and an outer part, or outer surface of the fibrous structure, the surface is preferably produced by weaving with a plain, satin or twill type weave, in order to limit these surface irregularities, a satin type weave additionally providing a smooth surface appearance.

It may be desirable to use yarns with different chemical natures between different parts of the fibrous structure, in particular between core and skin in order to confer particular properties on the resulting part made of composite material, in particular in terms of resistance to oxidation or wear.

Hence, in the case of a part made of thermostructural composite material with refractory fibre reinforcement, a fibrous structure can be used having carbon fibres in the core and ceramic fibres, for example silicon carbide (SiC), at the surface, in order to increase the resistance to wear and to oxidation of the composite part at this part of the surface.

According to a particular feature of the invention, the portion of the fibrous structure woven with a degree of interweaving greater than the degree of interweaving of the portion or portions of the fibrous texture woven upstream of the first weave portion extends (in the direction of advancement of the fibrous structure at the outlet of the loom) over at least 4 consecutive weft columns.

According to another particular feature of the invention, the warp yarns and the weft yarns present in the first type of weave have a degree of interweaving greater than or equal to 1.5 times the degree of interweaving of warp yarns and weft yarns present in the second type of weave.

Once the fibrous structure is woven, the first portion 411 having a high degree of interweaving is removed. According to an alternative embodiment, the first portion 411 can be removed at a later stage in the manufacture of the part made of composite material, for example after densifying by machining. The fibrous structure is shaped by compressing in order to form a ready to use densified fibrous preform. The fibrous preform is then densified in order to form a part made of composite material, for example a blade. The densification of the fibrous preform intended to form the fibrous reinforcement of the part to be manufactured consists of filling the pores of the preform, in all or part of the volume thereof, with the material constituting the matrix. This densification can be carried out in a manner that is known per se, following the liquid method (CVL) or the gaseous method (CVI), or the method of injecting a ceramic filler (Slurry Cast) or the method of impregnating with a silicon alloy (MI or RMI) or else following a sequence of one or more of these methods.

The liquid method involves impregnating the preform with a liquid composition containing a precursor of the matrix material. The precursor is usually in the form of a polymer, such as a high-performance epoxy resin, optionally diluted in a solvent. The preform is placed in a mould that can be closed in a sealed manner with a recess having the shape of the moulded final blade. The mould is then closed and the matrix precursor liquid (for example a resin) is injected into all of the recess in order to impregnate all of the fibrous part of the preform.

The transformation of the precursor into matrix, i.e. its polymerisation, is carried out by heat treatment, generally by heating the mould, after removal of any solvent and cross-linking of the polymer, the preform always being kept in the mould having a shape corresponding to that of the part to be produced.

In the case of the formation of a carbon ceramic matrix, the heat treatment consists of pyrolyzing the precursor in order to transform the matrix into a carbon or ceramic matrix depending on the precursor used and the pyrolysis conditions. By way of example, ceramic liquid precursors, in particular SiC or SiCN, can be polycarbosilane (PCS) polytitanocarbosilane (PTCS) or polysilazane (PSZ) resins, whereas carbon liquid precursors can be resins with a relatively high coke content, such as phenolic resins. Several consecutive cycles can be carried out from the impregnation up to the heat treatment, in order to achieve the desired degree of densification.

In the case, in particular, of the formation of an organic matrix, the densification of the fibrous preform can be produced by the well-known method of resin transfer moulding (RTM). According to the RTM method, the fibrous preform is placed in a mould having the external shape of the parts of be produced. A thermosetting resin is injected into the internal space of the mould, which comprises the fibrous preform. A pressure gradient is generally established in this inner space between the location where the resin is injected and the orifices for removal thereof, in order to control and optimise the impregnation of the preform by the resin.

The densification of the preform can also be produced by polymer impregnation and pyrolysis (PIP), or by slurry impregnation ("slurry cast"), containing for example SiC and organic binders, followed by an infiltration with liquid silicon ("Melt infiltration").

The densification of the fibrous preform can also be carried out in known manner, by the gaseous method by chemical vapour infiltration (CVI). The fibrous preform corresponding to the fibrous reinforcement of the blade to be produced is placed in a furnace, into which a reactive gaseous phase is admitted. The pressure and temperature prevailing in the furnace and the composition of the gaseous phase are chosen so as to enable the diffusion of the gaseous phase within the pores of the preform in order to form the matrix there by deposition, at the core of the material in contact with the fibres, of a solid material resulting from the decomposition of a constituent of the gaseous phase or from a reaction between several constituents, contrary to the pressure and temperature conditions specific to CVD processes ("Chemical Vapour Deposition") which lead exclusively to a deposit at the surface of the material.

The formation of a SiC matrix can be obtained with methyltrichlorosilane (MTS) giving SiC by decomposition of the MTS, while a carbon matrix can be obtained with hydrocarbon gases such as methane and/or propane providing carbon by cracking.

A densification combining liquid method and gaseous method can also be used in order to facilitate the implementation, limit the costs and the manufacturing cycles, while obtaining satisfactory characteristics for the envisaged use.

The densification methods described above make it possible to produce, from the fibrous structure of the invention, mainly parts made of composite material with organic matrix (CMO), carbon matrix (C/C) and ceramic matrix (CMC).

In the case of the production of a part made of an oxide/oxide composite material, the fibrous structure is impregnated with a slurry charged with refractory oxide particles. After removing the liquid phase of the slurry, the preform thus obtained undergoes a heat treatment in order to sinter the particles and to obtain a refractory oxide matrix. The impregnation of the structure can be carried out with methods showing a pressure gradient, such as injection moulding type methods "RTM" or submicron powder suction methods, termed "APS".

After densifying, a part made of composite material is obtained.

The fibrous structure and its method of manufacture according to the present invention can, in particular, be used to produce turbomachine blades, such as turbine rotor blades, fan blades, propellers, landing gear parts, blade sectors for gas turbine nozzles and flow straighteners.

The invention claimed is:

1. A method for weaving a fibrous structure intended to form the fibrous reinforcement of a turbomachine blade made of composite material comprising a fibrous reinforcement densified by a matrix, the fibrous structure being woven as a single piece on a loom by three-dimensional or multilayer weaving between a plurality of warp yarn layers and a plurality of weft yarn layers, the fibrous structure comprising a blade root preform, the method comprising at least one first weaving step in which the warp yarns and the weft yarns are woven according to a first type of weave so as to form a first portion of the blade root preform of the fibrous structure, and a second weaving step in which the warp yarns and the weft yarns are woven according to a second type of weave so as to form a second portion of the blade root preform of the fibrous structure continuing on from the first portion and located downstream of the first portion in the direction of advance of the fibrous structure at an outlet of the loom, the warp yarns and the weft yarns having a degree of interweaving in the first type of weave greater than the degree of interweaving of the warp yarns and the weft yarns present in the second type of weave, the degree of interweaving corresponding to a ratio of a number of layers of yarns crossed by the warp yarns or the weft yarns divided by a product of the weave ratio, a spacing between two weft columns and a spacing between two warp columns.

2. The method according to claim 1, wherein the warp yarns and the weft yarns present in the first type of weave have a degree of interweaving greater than or equal to 1.5 times the degree of interweaving of warp yarns and weft yarns present in the second type of weave.

3. The method according to claim 1, wherein the first and second weaves are of the same type.

4. The method according to claim 1, wherein the first and second weaves are of a different type.

5. The method according to claim 3, wherein the type of the first and second weaves is chosen from one of the following types: interlock, 3D orthogonal, multilayer plain or multilayer twill or multilayer satin.

6. The method according to claim 1, wherein the first type of weave extends over at least 4 consecutive columns of weft yarns.

7. A method for manufacturing a part made of composite material comprising:
    producing a fibrous structure in accordance with the method for weaving a fibrous structure according to claim 1,
    removing the first portion of the fibrous structure,
    shaping the fibrous structure in order to form a fibrous preform of the part to be manufactured, and
    densifying the fibrous preform.

8. A fibrous structure intended to form the fibrous reinforcement of a turbomachine blade made of composite material comprising a fibrous reinforcement densified by a matrix, the fibrous structure having a three-dimensional or multilayer weave between a plurality of warp yarn layers and a plurality of weft yarn layers, the fibrous structure comprising a blade root preform, wherein the blade root preform comprises at least one first portion having a first type of weave and a second portion continuing on from the first portion and having a second type of weave, the warp yarns and the weft yarns having a degree of interweaving in the first type of weave greater than the degree of interweaving of warp yarns and weft yarns present in the second type of weave, the degree of interweaving corresponding to a ratio of a number of layers of yarns crossed by the warp yarns or the weft yarns divided by a product of the weave ratio, a spacing between two weft columns and a spacing between two warp columns.

9. The fibrous structure according to claim 8, wherein the warp yarns and weft yarns present in the first type of weave have a degree of interweaving greater than or equal to 1.5 times the degree of interweaving of warp yarns and weft yarns present in the second type of weave.

10. The fibrous structure according to claim 8, wherein the first and second weaves are of the same type.

11. The fibrous structure according to claim 8, wherein the first and second weaves are of a different type.

12. The fibrous structure according to claim 10, wherein the type of the first and second weaves is chosen from one of the following types: interlock, 3D orthogonal, multilayer plain or multilayer twill or multilayer satin.

13. The fibrous structure according to claim 8, wherein the first type of weave extends over at least 4 consecutive columns of weft yarns.

* * * * *